United States Patent
Bogasky et al.

(10) Patent No.: US 12,110,886 B2
(45) Date of Patent: Oct. 8, 2024

(54) PISTON MONITORING ASSEMBLY

(71) Applicant: Illinois Tool Works Inc., Glenview, IL (US)

(72) Inventors: Jonathan Jacob Bogasky, Hendersonville, TN (US); Edward Wayne Bolyard, Jr., Old Hickory, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 116 days.

(21) Appl. No.: 17/798,540

(22) PCT Filed: Feb. 26, 2021

(86) PCT No.: PCT/US2021/019955
§ 371 (c)(1),
(2) Date: Aug. 9, 2022

(87) PCT Pub. No.: WO2021/174032
PCT Pub. Date: Sep. 2, 2021

(65) Prior Publication Data
US 2023/0079290 A1    Mar. 16, 2023

Related U.S. Application Data

(60) Provisional application No. 62/983,018, filed on Feb. 28, 2020.

(51) Int. Cl.
*F04B 51/00* (2006.01)
*B05C 5/02* (2006.01)
(Continued)

(52) U.S. Cl.
CPC ............ *F04B 51/00* (2013.01); *B05C 5/0225* (2013.01); *B05D 5/10* (2013.01); *G01D 5/145* (2013.01); *F04B 2201/0201* (2013.01)

(58) Field of Classification Search
CPC ............ F04B 51/00; F04B 2201/0201; B05C 5/0225; B05C 11/1002; G01D 5/145
See application file for complete search history.

(56) References Cited

U.S. PATENT DOCUMENTS

| 4,406,247 A | 9/1983 | Baughman et al. |
| 4,430,886 A | 2/1984 | Rood |
| (Continued) | | |

FOREIGN PATENT DOCUMENTS

| GB | 1250544 A | 10/1971 |
| GB | 2415951 A | 1/2006 |
| (Continued) | | |

OTHER PUBLICATIONS

International Preliminary Report on Patentability mailed Sep. 9, 2022 for corresponding PCT/US2021/019955 (9 pages).
(Continued)

*Primary Examiner* — Kenneth J Hansen
(74) *Attorney, Agent, or Firm* — Christopher R. Carroll; The Small Patent Law Group LLC

(57) ABSTRACT

A piston monitoring assembly includes a magnetic body coupled to a piston that is configured to move in opposite directions during a piston stroke to dispense a fluid, a magnetic sensor configured to output signals representative of a magnetic field generated by the magnetic body, and a controller configured to examine the signals output by the magnetic sensor and to determine whether the piston is moving far enough to ensure that the fluid is being dispensed during a first movement of the piston in the piston stroke and that the fluid is prevented from being dispensed during a second movement of the piston in the piston stroke.

20 Claims, 4 Drawing Sheets

(51) Int. Cl.
  *B05D 5/10* (2006.01)
  *G01D 5/14* (2006.01)

(56) References Cited

U.S. PATENT DOCUMENTS

| | | |
|---|---|---|
| 4,613,059 A | 9/1986 | Merkel |
| 4,842,162 A | 6/1989 | Merkel |
| 4,922,852 A | 5/1990 | Price |
| 4,957,782 A | 9/1990 | Medler et al. |
| 5,029,731 A | 7/1991 | Klatt |
| 5,114,752 A | 5/1992 | Hall |
| 5,205,439 A | 4/1993 | Sturm |
| 5,481,260 A | 1/1996 | Buckler et al. |
| 5,787,915 A | 8/1998 | Byers et al. |
| 5,999,106 A | 12/1999 | Buckler |
| 6,002,337 A | 12/1999 | Palfey et al. |
| 6,010,740 A | 1/2000 | Rutledge et al. |
| 6,032,832 A | 3/2000 | Dority et al. |
| 6,173,864 B1 | 1/2001 | Reighard et al. |
| 6,849,130 B2 | 2/2005 | Estelle |
| 6,983,860 B2 | 1/2006 | Arnaboldi |
| 7,007,563 B2 | 3/2006 | Spiegl et al. |
| 7,018,477 B2 | 3/2006 | Engel |
| 7,464,838 B2 | 12/2008 | Mimura et al. |
| 7,592,033 B2 | 9/2009 | Buckley et al. |
| 7,878,375 B2 | 2/2011 | Yajima |
| 7,980,197 B2 | 7/2011 | Prentice et al. |
| 7,996,096 B2 * | 8/2011 | Latwesen ............ F16K 37/0091 700/110 |
| 8,576,032 B2 | 11/2013 | Herbert et al. |
| 9,144,818 B2 | 9/2015 | Doyle et al. |
| 9,254,642 B2 | 2/2016 | Ciardella et al. |
| 9,346,075 B2 | 5/2016 | Aguilar et al. |
| 9,390,060 B2 | 7/2016 | Wang et al. |
| 9,435,460 B2 | 9/2016 | Herbert et al. |
| 2003/0185096 A1 | 10/2003 | Hollstein et al. |
| 2007/0069041 A1 | 3/2007 | Quinones et al. |
| 2012/0298696 A1 | 11/2012 | Milo et al. |
| 2017/0199513 A1 * | 7/2017 | Zientara ................. F04B 51/00 |

FOREIGN PATENT DOCUMENTS

| | | |
|---|---|---|
| JP | H08232914 A | 9/1996 |
| WO | 2007016151 A2 | 2/2007 |
| WO | 2007038111 A1 | 4/2007 |
| WO | 2010027695 A2 | 3/2010 |

OTHER PUBLICATIONS

International Search Report and Written Opinion for corresponding PCT/US2021/019955 (31 pages).

* cited by examiner

PISTON MONITORING ASSEMBLY

CROSS-REFERENCE TO RELATED APPLICATIONS

This application is a national phase entry of and claims priority to International Patent Application No. PCT/US2021/019955 (filed 26 Feb. 2021), which claims priority to U.S. Provisional Application No. 62/983,018 (filed 28 Feb. 2020). The entire disclosures of these applications are incorporated herein by reference.

BACKGROUND

Technical Field

The subject matter described herein relates to assemblies and methods that monitor movements of pistons, such as air-actuated pistons.

Discussion of Art

Some actuators include pistons that move up and down along a defined path in response to changes in air pressure. For example, some adhesive dispensing assemblies include air-actuated pistons that rapidly and repeatedly move down and up to direct hot adhesive onto a surface (e.g., of a packaging). These pistons may move down to dispense the adhesive and up to stop dispensing the adhesive. The pistons may move very small amounts during each stroke (e.g., each up-and-down movement) so that the pistons can rapidly move and dispense adhesive to more surfaces than if the pistons moved more slowly.

Completion of the strokes of the pistons may be monitored to ensure that the pistons are moving sufficiently far to dispense the adhesive. The movement of some pistons may be optically monitored by laser light and an optical sensor. But, given that the environment in which this optical monitoring occurs involves the rapid dispensing of an adhesive, the adhesive may block or interfere with the source of the laser light and/or the optical sensor.

BRIEF DESCRIPTION

In one embodiment, a piston monitoring assembly includes a magnetic body coupled to a piston that is configured to move in opposite directions during a piston stroke to dispense a fluid, a magnetic sensor configured to output signals representative of a magnetic field generated by the magnetic body, and a controller configured to examine the signals output by the magnetic sensor and to determine whether the piston is moving far enough to ensure that the fluid is being dispensed during a first movement of the piston in the piston stroke and that the fluid is prevented from being dispensed during a second movement of the piston in the piston stroke.

In one embodiment, a dispensing system includes a dispensing assembly including a piston configured to move in opposite directions during a piston stroke to control dispensing of a fluid adhesive, and a monitoring assembly comprising a magnetic body coupled to the piston and configured to generate a magnetic field. The monitoring assembly also includes a magnetic sensor configured to output a signal representative of the magnetic field generated by the magnetic body. The monitoring assembly also includes a controller configured to examine the signal output by the magnetic sensor and to determine whether the piston is one or more of moving far enough to dispense the adhesive or moving far enough to stop dispensing of the adhesive.

In one embodiment, a method includes obtaining signals from a magnetic sensor that are representative of a magnetic field generated by a magnetic body that is coupled to a piston moving in opposite directions during a piston stroke to dispense a fluid adhesive, and examining the signals output by the magnetic sensor to determine whether the piston is moving far enough to ensure that the fluid adhesive is being dispensed during a first movement of the piston in the piston stroke and that the fluid adhesive is prevented from being dispensed during a second movement of the piston in the piston stroke.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide a piston monitoring assembly and method that monitor movements of a piston using a magnetic sensor. The monitoring assemblies and methods can detect small movements of the piston to determine whether complete strokes of the piston are being completed. The monitoring assemblies and methods can be used to determine whether air-actuated pistons are completing strokes of relatively small movements. For example, the monitoring assemblies and methods can verify whether the pistons are completing strokes having a total distance (from the top of the stroke movement to the bottom of the stroke movement) of 0.3 millimeters to 0.6 millimeters.

While the description of one embodiment of the monitoring assemblies and methods relates to monitoring movements of air-actuated pistons used in adhesive applications, not all embodiments of the inventive subject matter are limited in this one. One or more other embodiments may be used to monitor movements of electronically actuated pistons, electromagnetically actuated pistons, pistons that are pneumatically actuated using a fluid other than air, etc. As another example, one or more embodiments may be used to monitor movements of pistons used in applications other than dispensing adhesive, such as pistons that actuate to dispense fluid medications.

Figure 1:
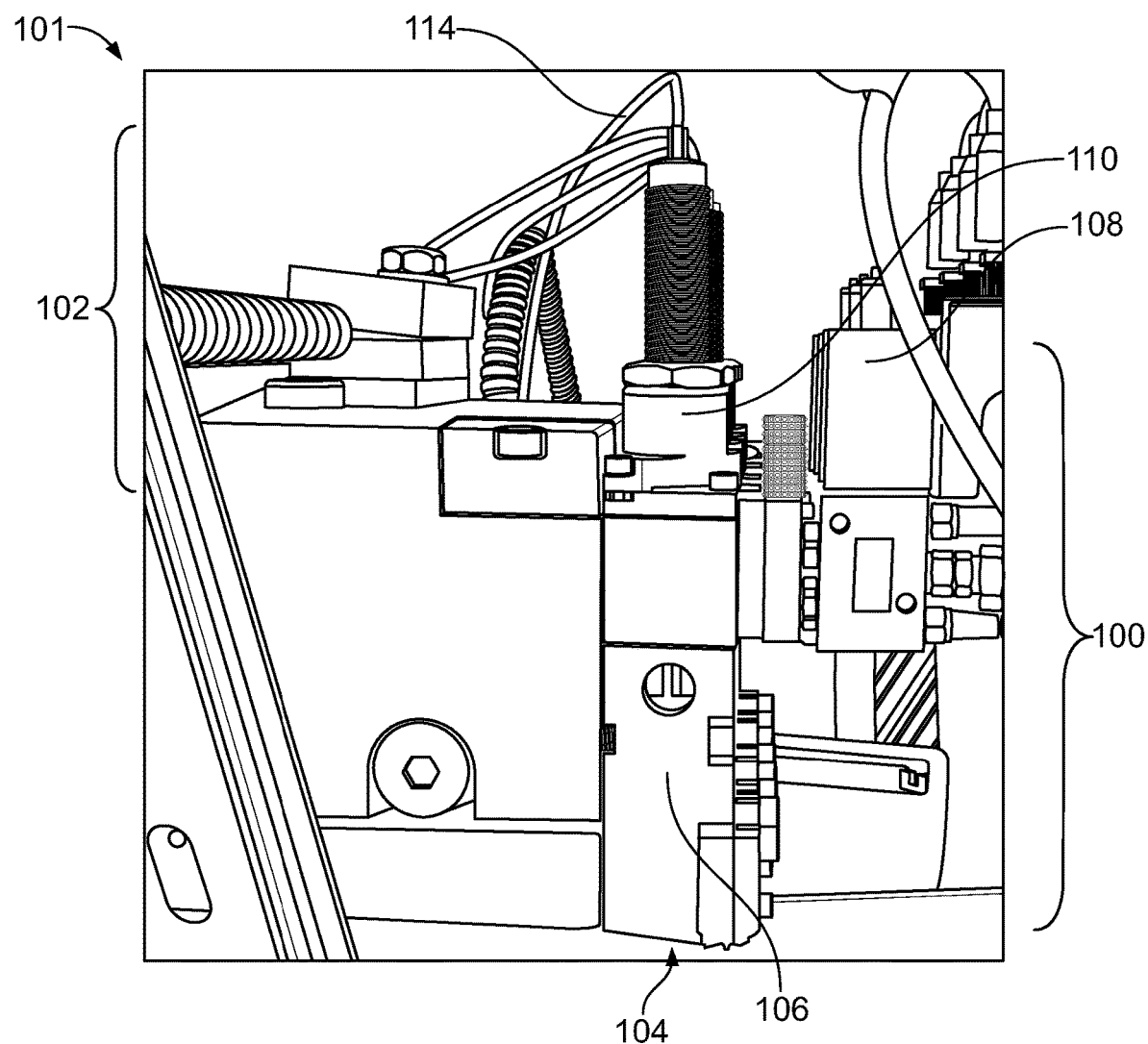
FIG. 1 illustrates one example of a dispensing system having a piston monitoring assembly.

FIG. 1 illustrates one example of a dispensing system 101 having a piston monitoring assembly 102. The dispensing system 101 includes a dispensing assembly 100 and the monitoring assembly 102. The dispensing assembly 100 includes a module housing 106 having a dispensing end 104 by the internal movement of a piston (shown and described below in connection with FIG. 2). The dispensing assembly 100 can be used to eject an adhesive (e.g., hot glue) from a dispensing opening (shown in FIG. 2) in the dispensing end 104 of the module housing 106. A valve device 108 having one or more valves inside can control the flow of an actuating fluid into and out of the interior of the module housing 106. For example, the valve device 108 can control when pressurized air is directed into the module housing 106 above the piston (e.g., to move the internal piston down during a stroke of the piston to dispense adhesive) and when the pressurized air is directed into the module housing 106 below the piston (e.g., to move the internal piston up during the stroke of the piston to stop dispensing adhesive).

A sensor housing 110 of the monitoring assembly 102 holds a magnetic sensor (shown in FIG. 2) in close proximity to the module housing 106. The sensor housing 110 may be coupled to the module housing 106, such as by mechanically securing the sensor housing 110 to the module housing 106. The monitoring assembly 102 includes a controller (not visible in FIG. 1 but shown in FIG. 4) that is coupled with the magnetic sensor by one or more connections 114. The connection 114 shown in FIG. 1 is a conductive connection formed by one or more wires, cables, buses, or the like. Optionally, the connection 114 can include one or more wireless connections.

Figure 2:
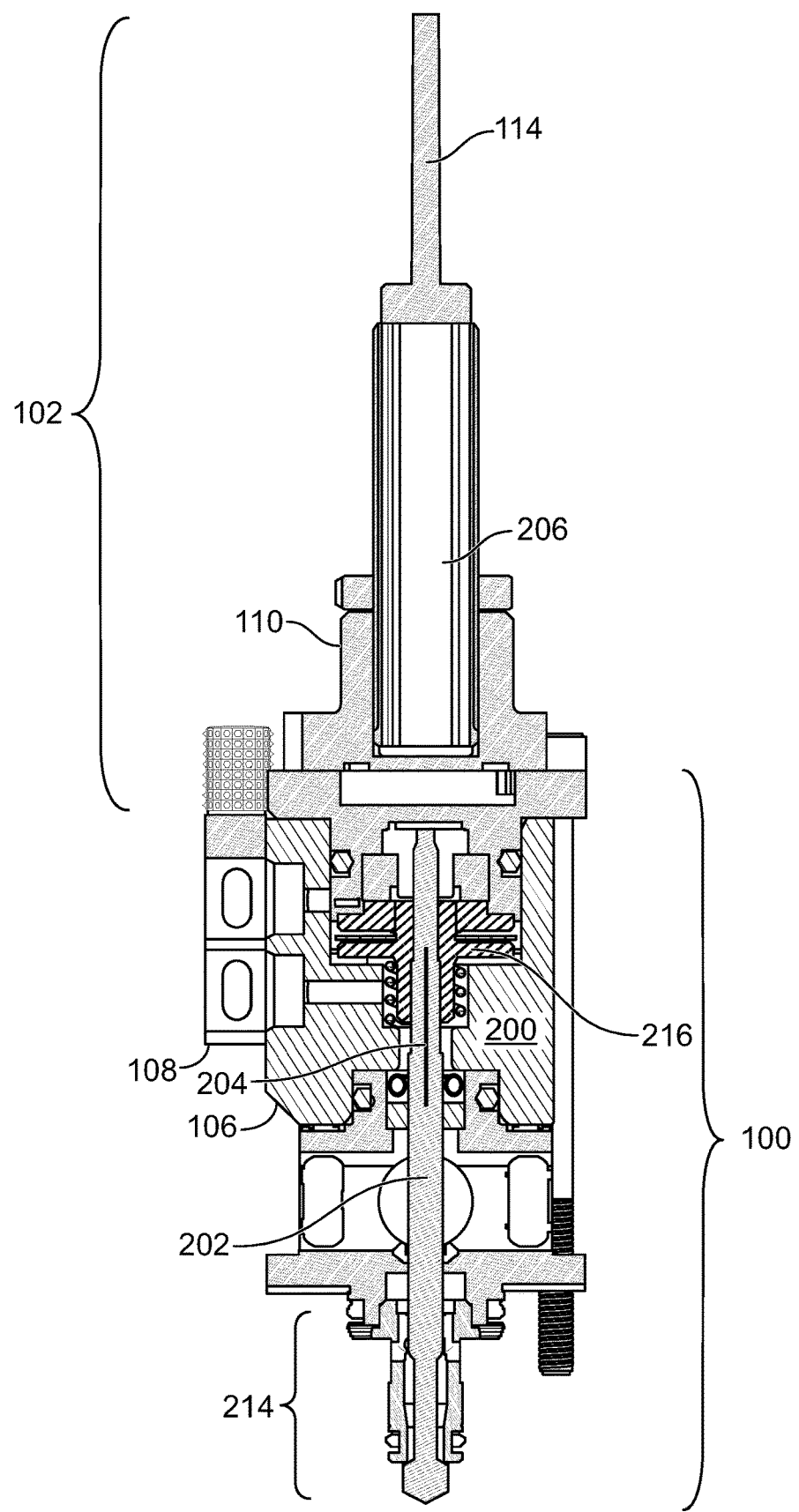
FIG. 2 illustrates a cross-sectional view of one embodiment of a dispensing assembly and the monitoring assembly shown in FIG. 1.
Figure 3:
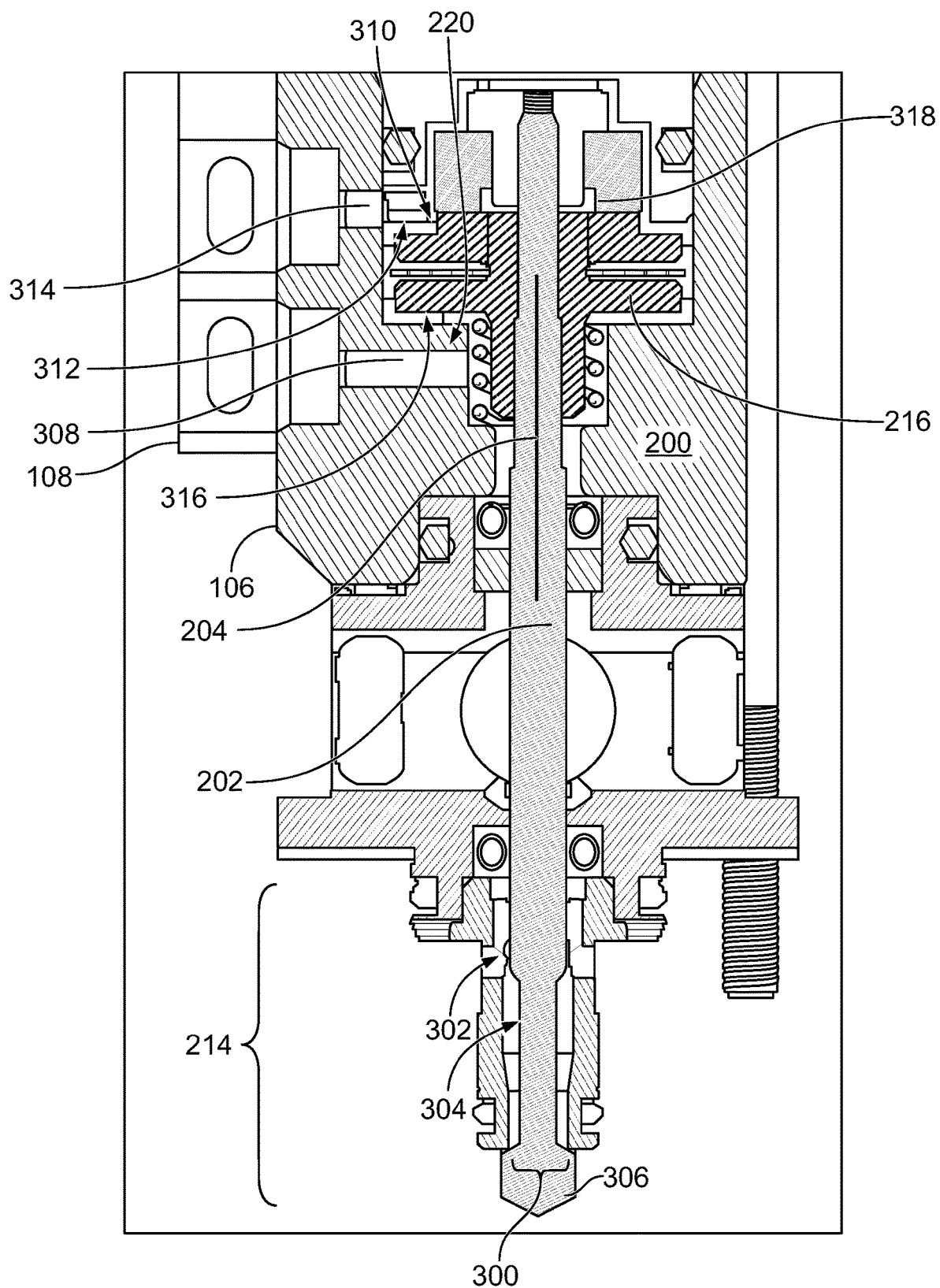
FIG. 3 illustrates a lower portion of the dispensing assembly shown in FIG. 2.

FIG. 2 illustrates a cross-sectional view of one embodiment of the dispensing assembly 100 and the monitoring assembly 102. FIG. 3 illustrates a lower portion of the dispensing assembly 100. The module housing 106 includes an interior chamber 200 in which an elongated shaft 202 is located. The shaft 202 moves up-and-down along a center axis 204 of the shaft 202 to control the dispensing of adhesive out of a dispensing opening 300 (labeled in FIG. 3) in a dispensing body 214 of the module housing 106. The dispensing body 214 can be a fixture having internal conduits and that is coupled with the rest of the module housing 106.

For example, a flow of adhesive may be provided through a lateral conduit 302 (labeled in FIG. 3) in a lower portion (e.g., the dispensing body 214) of the monitoring assembly 102. A lower portion of the shaft 202 is disposed in a vertical conduit 304 (labeled in FIG. 3) of the dispensing body 214. The vertical conduit 304 intersects the lateral conduit 302 in the dispensing body 214. The adhesive can laterally flow or move through the lateral conduit 302 and then vertically flow downward in the vertical conduit 304 outside of the shaft 202. An outer, lower end 306 (labeled in FIG. 3) of the shaft 202 is larger than the dispensing opening 300. As a result, the bulbous lower end 306 of the shaft 202 closes the dispensing opening 300 such that no adhesive can exit via the dispensing opening 300 while the shaft 202 is in the position shown in FIG. 2 (i.e., the top or near the top of the piston stroke). The lower end 306 of the shaft 202 moves below the dispensing opening 300 when the shaft 202 moves downward (i.e., toward or at the bottom of the piston stroke). This creates separation between the lower end 306 of the shaft 202 and the dispensing opening 300 in the dispensing body 214. This separation allows adhesive in the vertical conduit 304 to exit out of the dispensing opening 300 (e.g., onto a target surface).

Movement of the shaft 202 is controlled by movement of a piston 216 to which the shaft 204 is coupled. For example, the piston 216 may be coupled to the shaft at or near an opposite end of the shaft 202 (opposite to the lower end 306 of the shaft 202). The piston 216 is located in the interior chamber 200 of the module housing 106. The valve device 108 can inject or otherwise direct pressurized fluid (e.g., air) into the interior chamber 200 via a lower conduit port 308 that extends into the interior chamber 200 to push the piston 216 up in the interior chamber 200 to the position shown in FIG. 2. The piston 216 includes an upper contact surface 310 that can contact an interior step 310 of the module housing 106 to limit how far the piston 216 moves up in the interior chamber 200 (e.g., in a direction away from the dispensing opening 300). The piston 216 can be driven up to the position shown in FIGS. 2 and 3 such that the upper contact surface 310 contacts the step 312. This pulls the shaft 202 up so that the lower end 306 of the shaft 202 closes the dispensing opening 300.

The valve device 108 can then direct pressurized fluid (e.g., air) into the interior chamber 200 via an upper conduit port 314 (labeled in FIG. 3) that also extends into the interior chamber 200 to push the piston 216 down in the interior chamber 200. The piston 216 includes a lower contact surface 316 that is opposite of the upper contact surface 310 (e.g., the surfaces 310, 316 face opposite directions). This lower contact surface 316 can contact the lower conduit port 308 to limit the downward movement of the piston 216. As described above, this downward movement lowers the shaft 202 to separate the lower end 306 of the shaft 202 from the dispensing opening 300 to dispense adhesive.

The movement of the piston 216 from the upper position shown in FIGS. 2 and 3 to the lower position and back to the upper position is one stroke of the piston 216. The distance between the upper and lower positions of the piston 216 may be relatively small, such as 0.3 millimeters to 0.6 millimeters. Alternatively, this can be a longer or shorter distance.

The monitoring assembly 100 includes a magnetic sensor 206 (shown in FIG. 2) disposed in the sensor housing 110 and a magnetic body 318 (labeled in FIG. 3) coupled with the piston 216. The magnetic body 318 can be a permanent magnet. Alternatively, the magnetic body 318 may be a semi-permanent magnet (e.g., temporary magnet) or electromagnet. The magnetic sensor 206 can be an analog magnetic sensor that outputs or generates a voltage (e.g., a direct current) having a magnitude that corresponds with the amount of magnetic field detected by the sensor 206. For example, the magnetic sensor 206 can be a Hall effect sensor. A magnetic field inside of the module housing 106 prevents voltage from passing through the sensor 206. As the piston 216 and the magnetic body 318 moves away from the sensor 206 during the downward movement of the piston 216 during the stroke of the piston, a voltage output of the sensor 206 increases. As the piston 216 and the magnetic body 318 move toward the sensor 206 during the upward movement of the piston 216 during the stroke of the piston, the voltage output of the sensor 206 decreases. Alternatively, the magnetic sensor 206 can be a digital sensor and/or provide an output other than a voltage, such as a digital signal that indicates movement and/or the position of the piston 216. While only one sensor 206 and one magnetic body 318 are shown, alternatively, more than one sensor 206 and/or more than one magnetic body 318 may be used.

Figure 4:
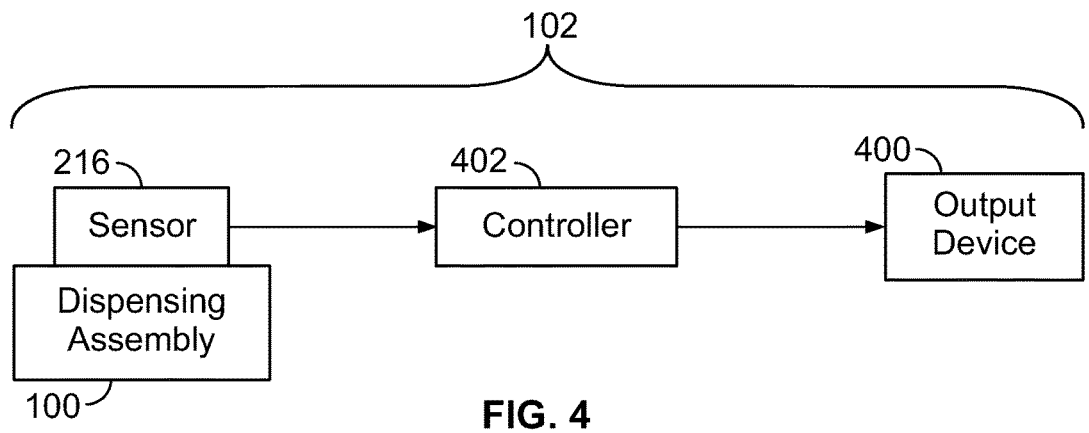
FIG. 4 illustrates one example of operation of the monitoring assembly shown in FIG. 1.

FIG. 4 illustrates one example of operation of the monitoring assembly 100. The monitoring assembly 100 can include an output device 400 that provides notifications of movement of the piston 216 in the dispensing assembly 100. A controller 402 receives the output from the sensor 206 via the connection(s) 114. The controller 402 can represent hardware circuitry, such as one or more circuit boards having or coupled with one or more processors (e.g., microprocessors, field programmable gate arrays, microcontrollers, integrated circuits, etc.) that monitors output from the magnetic sensor and controls information presented by the output device 400. The output device 400 can represent one or more lights or lamps, an electronic display, a speaker, or the like. The output device 400 can be controlled by the controller 402 to present notifications of movement of the piston 216. For example, a light may be actuated, a message may be displayed, an alarm may be sounded, etc., responsive to the piston 216 not moving through an entire distance of the expected stroke of the piston 216. Stated differently, the controller 402 can compare the output by the sensor 206 to determine how far the piston 216 is moving. If the output indicates that the piston 216 is or has moved is less than a designated distance during the downward part of the stroke of the piston 216, then the controller 402 can direct the output device 400 to provide a notification.

In one embodiment, the hardware circuitry of the controller 402 includes an amplifier that can receive a voltage (e.g., twenty-four volts of a positive direct current polarity) when the monitoring assembly 102 is activated. The controller 402 can be calibrated by way of an input signal or a manual input (e.g., pressing a button of the controller 402) that is provided before movement of the piston 216. For example, the input can be provided to the controller 402 while the piston 216 is at a known position (e.g., the bottom or lowest position of the stroke). The controller 402 can examine the output from the sensor 206 when the input is provided for calibration. The controller 402 can then associate this output with the zero or lowest position of the piston 216. The controller 402 can compare this output to one or more other outputs of the sensor 206 to determine where the piston 216 is located relative to the known position, when the piston 216 is located at the known position, and/or how far the piston 216 is from the known position.

Once the dispensing assembly 100 is activated, the piston 216 moves up and down through the strokes of the piston 216. The movement of the piston 216 changes the magnetic field detected by the sensor 206 from the magnetic body 306. The strength of the magnetic field perceived by the sensor 206 causes the sensor 206 to change the voltage that is output to the controller 402 by a small amount. The controller 402 can measure the output voltage at roughly eight samples per 200 microseconds. Alternatively, the controller 402 can measure the output voltage more or less frequently.

The controller 402 can sort the measurements of the voltage outputs from the sensor 206. For example, the controller 402 can use a median sorting algorithm to determine a value of the output of the sensor 206, which can be used to determine the location or movement of the piston 216. The controller 402 can apply one or more software filters to analyze the value that is output from the sorting algorithm to determine upper and lower positions of the piston 216 during the stroke of the piston 216. For example, the controller 402 can identify a maximum value that is output from the sorting and filtering and associate this value with the lowest position of the piston 216 during the stroke.

The controller 402 can identify a minimum value that is output from the sorting and filtering and associate this value with the highest position of the piston 216 during the stroke. The controller 402 optionally can adjust one or more of these values or positions due to changes in temperature. The controller 402 can examine the distances that the piston 216 moves in the stroke over time. If the distances change enough to constitute physical movement of the piston 216, the controller 402 can generate and communicate an output signal for the corresponding sensor 206 (where multiple sensors 206 are used).

For example, if the distances determined by the controller 402 are no smaller than a threshold distance, the controller 402 can output a signal. If the distances determined by the controller 402 are smaller than this threshold distance, then the controller 402 may not output a signal. This output signal can be presented by an operator via the output device 400, as described above. Alternatively, if the distances determined by the controller 402 are smaller than the threshold distance, the controller 402 can output a signal but if the distances determined by the controller 402 are no smaller than this threshold distance, then the controller 402 may not output the signal. The threshold distance can be a distance that the piston 216 needs to move to ensure there is clearance or separation between the lower end 306 of the shaft 202 and the dispensing opening 300 to dispense adhesive.

Alternatively, the controller 402 may examine the voltages output by the sensor 206 and compare these voltages to a lower threshold voltage and to an upper threshold voltage. The lower threshold voltage may be associated with a position of the piston 216 that is high enough to ensure that the lower end 306 of the shaft 202 closes the dispensing opening 300 (which may not be the highest possible position of the piston 216). The upper threshold voltage may be associated with a position of the piston 216 that is low enough to ensure that the lower end 306 of the shaft 202 opens the dispensing opening 300 (which may not be the lowest possible position of the piston 216). The controller 402 can control the output device 400 to notify an operator of the assembly 100 responsive to the output from the sensor 206 not being as great as the upper threshold voltage (indicating that the piston 216 is not low enough to cause the lower end 306 of the shaft 202 to open the dispensing opening 300).

The controller 402 can control the output device 400 to notify the operator responsive to the output from the sensor 206 not being as small as the lower threshold voltage (indicating that the piston 216 is not high enough to cause the lower end 306 of the shaft 202 to close the dispensing opening 300). Alternatively, the controller 402 can control the output device 400 to notify an operator of the assembly 100 responsive to the output from the sensor 206 being at least as large as the upper threshold voltage (indicating that the piston 216 is low enough to cause the lower end 306 of the shaft 202 to open the dispensing opening 300) and the controller 402 can control the output device 400 to notify the operator responsive to the output from the sensor 206 being less than the lower threshold voltage (indicating that the piston 216 is high enough to cause the lower end 306 of the shaft 202 to close the dispensing opening 300).

Figure 5:
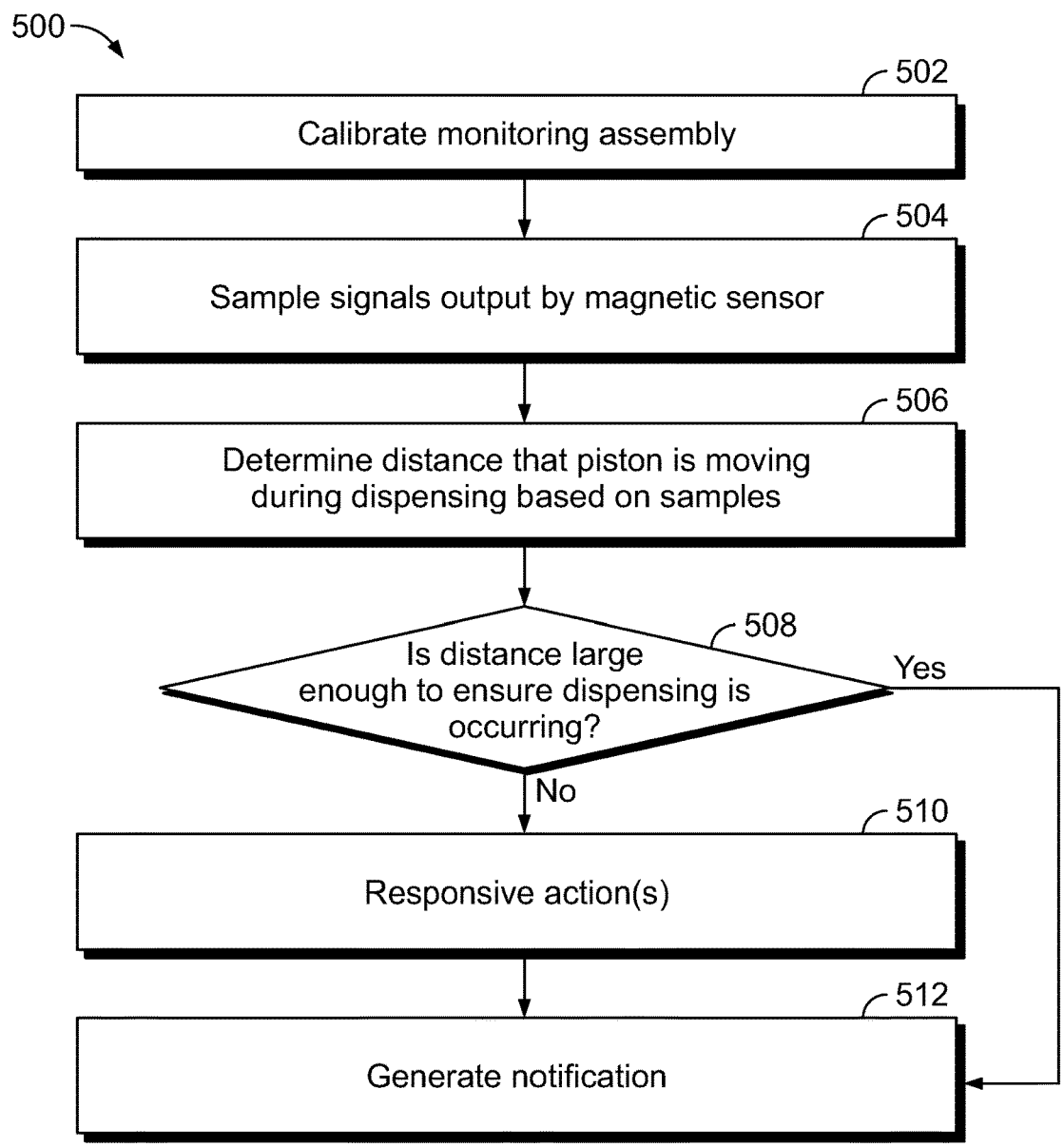
FIG. 5 illustrates a flowchart of one example of a method for monitoring operation of a dispensing assembly.

FIG. 5 illustrates a flowchart of one example of a method 500 for monitoring operation of a dispensing assembly. In one embodiment, the method 500 can represent operations performed by the monitoring assembly 102 to monitor movement of the piston 216 during dispensing of adhesive. At 502, the monitoring assembly is calibrated. For example, the output from the magnetic sensor may be examined while the piston of the dispensing assembly is at a known position (e.g., the bottom position of the stroke of the piston). At 504, signals output by the magnetic sensor are sampled while the dispensing assembly operates. For example, the output from the magnetic sensor is repeatedly examined while the piston moves up and down in the dispensing assembly. At 506, one or more distances that the piston is moving are determined. The distances can be determined by comparing the sensor outputs with each other and/or to the output from the known position of the piston, as described above.

At 506, a determination is made as to whether the distance(s) that the piston is moving is or are large enough to ensure dispensing is occurring. For example, the sensor outputs and/or distances may be compared to one or more thresholds to determine whether the end of the shaft to which the piston is coupled is lowering enough to allow adhesive to be dispensed out of the dispensing opening. The sensor outputs and/or distances may be compared to one or more thresholds to determine whether the end of the shaft to which the piston is coupled is raising enough to prevent adhesive from being dispensed out of the dispensing opening.

If the distance that the piston is moving is long enough to ensure that dispensing is occurring and the dispensing opening is being closed between the dispensing of adhesive, then the dispensing assembly may be operating properly. As a result, flow of the method 500 can continue toward 512. At 512, a notification can be provided, such as a light can be activated, a message can be displayed, or the like, to notify the operator that the dispensing assembly is operating properly.

But, if the distance that the piston is moving is not long enough to ensure that dispensing is occurring and the dispensing opening is being closed between the dispensing of adhesive, then the dispensing assembly may not be operating properly. As a result, flow of the method 500 can continue toward 510. At 510, one or more responsive actions may be implemented. For example, a notification can be provided, such as a light can be activated, an alarm can sound, a message can be displayed, the dispensing assembly may be deactivated or turned off, or the like, to notify the operator that the dispensing assembly is not operating properly. Alternatively, no responsive action is implemented.

Following 510 or 512, the method 500 can terminate or flow of the method 500 can return to one or more other operations, such as 504.

In one embodiment, a piston monitoring assembly includes a magnetic body coupled to a piston that is configured to move in opposite directions during a piston stroke to dispense a fluid, a magnetic sensor configured to output signals representative of a magnetic field generated by the magnetic body, and a controller configured to examine the signals output by the magnetic sensor and to determine whether the piston is moving far enough to ensure that the fluid is being dispensed during a first movement of the piston in the piston stroke and that the fluid is prevented from being dispensed during a second movement of the piston in the piston stroke.

Optionally, the controller is configured to examine the signals to monitor movement of the piston over distances of no more than 0.6 millimeters.

Optionally, the first movement of the piston is a downward movement of the piston.

Optionally, the second movement of the piston is an upward movement of the piston.

Optionally, the controller is configured to obtain repeated samples of the signals output by the magnetic sensor and to sort the samples to determine an upper position of the piston and a lower position of the piston.

Optionally, the magnetic sensor is configured to output analog voltages as the signals that are output.

Optionally, the magnetic sensor is a first magnetic sensor and further comprising at least a second magnetic sensor configured to output the signals representative of the magnetic field generated by the magnetic body.

Optionally, the controller is configured to examine the signals output by the first magnetic sensor and by at least the second magnetic sensor to determine whether the piston is moving far enough to ensure that the fluid is being dispensed during the first movement of the piston in the piston stroke and that the fluid is prevented from being dispensed during the second movement of the piston in the piston stroke.

In one embodiment, a dispensing system includes a dispensing assembly including a piston configured to move in opposite directions during a piston stroke to control dispensing of a fluid adhesive, and a monitoring assembly comprising a magnetic body coupled to the piston and configured to generate a magnetic field. The monitoring assembly also includes a magnetic sensor configured to output a signal representative of the magnetic field generated by the magnetic body. The monitoring assembly also includes a controller configured to examine the signal output by the magnetic sensor and to determine whether the piston is one or more of moving far enough to dispense the adhesive or moving far enough to stop dispensing of the adhesive.

Optionally, the controller is configured to examine the signal output by magnetic sensor to ensure that the adhesive is being dispensed during a downward movement of the piston in the piston stroke and that the fluid is prevented from being dispensed during an upward movement of the piston in the piston stroke.

Optionally, the controller is configured to examine the signal to monitor movement of the piston over distances of no more than 0.6 millimeters.

Optionally, the controller is configured to obtain repeated samples of the signal output by the magnetic sensor and to sort the samples to determine an upper position of the piston and a lower position of the piston.

Optionally, the magnetic sensor is configured to output an analog voltage as the signal.

Optionally, the magnetic sensor is a first magnetic sensor and further comprising at least a second magnetic sensor configured to output the signal representative of the magnetic field generated by the magnetic body.

Optionally, the controller is configured to examine the signals output by the first magnetic sensor the at least the second magnetic sensor to determine one or more of whether the piston is moving far enough to ensure that the adhesive is being dispensed.

In one embodiment, a method includes obtaining signals from a magnetic sensor that are representative of a magnetic field generated by a magnetic body that is coupled to a piston moving in opposite directions during a piston stroke to dispense a fluid adhesive, and examining the signals output by the magnetic sensor to determine whether the piston is moving far enough to ensure that the fluid adhesive is being dispensed during a first movement of the piston in the piston stroke and that the fluid adhesive is prevented from being dispensed during a second movement of the piston in the piston stroke.

Optionally, the method also includes sorting the samples to determine an upper position of the piston and a lower position of the piston.

Optionally, the signals are received from the magnetic sensor and at least one additional magnetic sensor.

Optionally, the first movement is upward movement of the piston.

Optionally, the second movement is downward movement of the piston.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   obtaining signals from a magnetic sensor disposed outside of an interior chamber of a housing of a dispensing system, the signals representative of a magnetic field generated by a magnetic body that is coupled to a piston within the interior chamber, the piston moving in opposite directions within the interior chamber responsive to injecting pressurized fluid into the interior chamber during a piston stroke to dispense a fluid adhesive via a dispensing opening of the dispensing system; and
   examining the signals output by the magnetic sensor to determine whether the piston is moving far enough to ensure that the dispensing opening is open and the fluid adhesive is being dispensed during a first movement of the piston in the piston stroke and that the dispensing opening is closed and the fluid adhesive is prevented from being dispensed during a second movement of the piston in the piston stroke.

2. The method of claim 1, further comprising:
   sorting the signals to determine an upper position of the piston and a lower position of the piston, the signals sorted to identify a smaller value of the signals that is associated with the upper position of the piston and to identify a larger value of the signals that is associated with the lower position of the piston.

3. The method of claim 1, wherein the signals are received from the magnetic sensor and at least one additional magnetic sensor.

4. The method of claim 1, wherein the first movement is upward movement of the piston.

5. The method of claim 1, wherein the second movement is downward movement of the piston.

6. A dispensing system comprising:
   a dispensing assembly including a housing with an interior chamber in which a piston is connected to an elongated shaft and is configured to move in opposite directions in the interior chamber as pressurized fluid is directed into the interior chamber during a piston stroke to control dispensing of a fluid adhesive, the dispensing assembly having a dispensing opening through which the fluid adhesive is dispensed, the piston moving to at least an upper position to move the elongated shaft to close the dispensing opening, the piston moving to at least a lower position to open the dispensing opening; and
   a monitoring assembly comprising a magnetic body coupled to the piston inside the interior chamber and configured to generate a magnetic field, the monitoring assembly also including a magnetic sensor disposed outside the interior chamber of the housing and configured to output a signal representative of the magnetic field generated by the magnetic body, the monitoring assembly also including a controller configured to examine the signal output by the magnetic sensor and to determine whether the piston is one or more of moving the elongated shaft far enough down and away from the dispensing opening to dispense the fluid adhesive or moving the elongated shaft far enough upward to close the dispensing opening and stop dispensing of the fluid adhesive.

7. The dispensing system of claim 6, wherein the controller is configured to examine the signal output by magnetic sensor to ensure that the adhesive is being dispensed during a downward movement of the piston in the piston stroke and that the fluid is prevented from being dispensed during an upward movement of the piston in the piston stroke.

8. The dispensing system of claim 6, wherein the controller is configured to examine the signal to monitor movement of the piston over distances of no more than 0.6 millimeters.

9. The dispensing system of claim 6, wherein the controller is configured to obtain repeated samples of the signal output by the magnetic sensor and to sort the samples to determine an upper position of the piston and a lower position of the piston, the controller configured to determine the lower position of the piston by selecting a larger value of the samples that are sorted as representing the lower position, the controller configured to determine the upper position of the piston by selecting a smaller value of the samples that are sorted as representing the upper position.

10. The dispensing system of claim 6, wherein the magnetic sensor is configured to output an analog voltage as the signal.

11. The dispensing system of claim 6, wherein the magnetic sensor is a first magnetic sensor and further comprising at least a second magnetic sensor configured to output the signal representative of the magnetic field generated by the magnetic body.

12. The dispensing system of claim 11, wherein the controller is configured to examine the signals output by the first magnetic sensor the at least the second magnetic sensor to determine one or more of whether the piston is moving far enough to ensure that the fluid adhesive is being dispensed.

13. A piston monitoring assembly comprising:
   a housing having an interior chamber in which an elongated shaft is located;
   a dispensing body fluidly coupled with the interior chamber of the housing, the dispensing body having a dispensing opening through which a fluid is dispensed;
   a magnetic body coupled to a piston inside the interior chamber, the piston configured to move in opposite directions during a piston stroke as pressurized fluid is directed into the interior chamber, the piston coupled with the elongated shaft and configured to move the shaft in the opposite directions between an upper position of the piston in the piston stroke and a lower position of the piston in the piston stroke, the elongated shaft configured to be moved by the piston while the piston moves toward or to the upper position in the piston stroke to close the dispensing opening and prevent dispensing of the fluid, the elongated shaft configured to be moved by the piston while the piston moves toward or to the lower position in the piston stroke to open the dispensing opening and dispense the fluid;

a magnetic sensor disposed outside the interior chamber and configured to output signals representative of a magnetic field generated by the magnetic body; and a controller configured to examine the signals output by the magnetic sensor and to determine whether the piston is moving far enough to ensure that the fluid is being dispensed while the piston is moved toward or to the lower position of the piston stroke during a lowering movement of the piston in the piston stroke and that the fluid is prevented from being dispensed while the piston is moved toward or to the upper position of during a raising movement of the piston in the piston stroke.

14. The piston monitoring assembly of claim 13, wherein the controller is configured to examine the signals to monitor movement of the piston over distances of no more than 0.6 millimeters.

15. The piston monitoring assembly of claim 13, wherein the controller is configured to obtain repeated samples of the signals output by the magnetic sensor and to sort the samples to determine the upper position of the piston and the lower position of the piston.

16. The piston monitoring assembly of claim 15, wherein the controller is configured to select a maximum value of the samples that are sorted as representing the lower position of the piston stroke, the controller configured to select a minimum value of the samples that are sorted as representing the upper position of the piston stroke.

17. The piston monitoring assembly of claim 13, wherein the magnetic sensor is configured to output analog voltages as the signals that are output.

18. The piston monitoring assembly of claim 13, wherein the magnetic sensor is a first magnetic sensor and further comprising at least a second magnetic sensor configured to output the signals representative of the magnetic field generated by the magnetic body.

19. The piston monitoring assembly of claim 18, wherein the controller is configured to examine the signals output by the first magnetic sensor and by at least the second magnetic sensor to determine whether the piston is moving far enough to ensure that the fluid is being dispensed during the lowering movement of the piston in the piston stroke and that the fluid is prevented from being dispensed during the raising movement of the piston in the piston stroke.

20. The piston monitoring assembly of claim 13, wherein the signals represent sensed voltages, and the controller is configured to compare the sensed voltages to a lower threshold voltage and to an upper threshold voltage, the lower threshold voltage associated with an upper position of the piston that raises the elongated shaft to close the dispensing opening, the upper threshold voltage associated with a lower position of the piston that lowers the elongated shaft to open the dispensing opening.

* * * * *